United States Patent [19]
Pastore

[11] Patent Number: 5,228,830
[45] Date of Patent: Jul. 20, 1993

[54] WICKET GATE

[76] Inventor: Joseph Pastore, 250 Foreside Rd., Cumberland, Me. 04110

[21] Appl. No.: 627,341

[22] Filed: Dec. 14, 1990

[51] Int. Cl.$^5$ .................................... F01D 5/14
[52] U.S. Cl. .................... 415/200; 415/163; 29/889.71; 264/273
[58] Field of Search ............... 415/163, 200; 416/241 R, 241 A; 29/889.71, 527.2; 264/273, 236, 347

[56] References Cited

U.S. PATENT DOCUMENTS

| | | | |
|---|---|---|---|
| 3,357,850 | 12/1967 | Baker | 29/889.71 |
| 3,588,267 | 6/1971 | Wikinson | |
| 3,829,238 | 8/1974 | Speck | |
| 3,876,327 | 4/1975 | Lobanoff | |
| 4,120,602 | 10/1978 | Megnint | 415/1 |
| 4,946,347 | 8/1990 | Otto | 415/200 |

FOREIGN PATENT DOCUMENTS 0036794 3/1983 Japan ................. 416/241 A

OTHER PUBLICATIONS

"Hydropower Engineering", Mayo, Carson, and Sheldon, Prentice-Hall, 1984, pp. 101-147 and 164-199.

Primary Examiner—Richard A. Bertsch
Assistant Examiner—Christopher Verdier
Attorney, Agent, or Firm—Thomas L. Bohan

[57] ABSTRACT

This invention relates to an improvement in an apparatus for directing the flow of water from the penstock to the vanes of a hydraulic turbine, generally referred to as a wicket gate, and a method for making the improved wicket gate. The improved wicket gate comprises a rotatable planar body made either of a high-strength plastic material or metal, onto which a viscoelastic material is affixed. The improvement lies in the application of the viscoelastic material to the rotatable planar body in such a way that the viscoelastic material becomes an integral component of the rotatable planar body. This improvement extends the maintenance life cycle by reducing marine growth, erosion and pitting caused by cavitation.

32 Claims, 3 Drawing Sheets

500
WICKET GATE

BACKGROUND OF THE INVENTION

1. Field of the Invention

This invention relates to valves designed to control the flow of water through hydraulic turbines. More particularly, this invention belongs to the category of valve controls known as wicket gates, which are used to direct high speed water flow against turbine vanes.

2. Description of Prior Art

Hydro-power generating systems are dependent on a continuous source of water. This source of water is commonly drawn from an open reservoir, such as a river, a lake, or an ocean. In general, the water intake requirements can amount to many thousands of gallons per minute. Turbines of the type used to transform the hydrostatic pressure associated with such high water flow rates into electric power are equipped with adjustable valves referred to as wicket gates. Pairs of these wicket gates are placed in the penstock tube—the conduit that is used to carry water from its source to the turbine. Typically there are ten pairs of wicket gates to a turbine. The gates direct water to the vanes of the turbine, whereby the water motion is converted to rotary turbine motion. The wicket gates are used to provide regulation of the power output of the turbine by directing water into the turbine at whatever flow rate is demanded at a particular time. This regulation is achieved by adjusting the openings of the wicket gates, thereby providing a particularly useful means of compensation as the hydrostatic head varies with the filling or emptying of a storage reservoir. This regulation is also useful in modulating sudden flow surges to the turbine when it is started and stopped.

Additionally, in the distinct class of water-moving devices known as reversible pump-turbines—wherein water motion may be converted to mechanical motion and, in reverse, mechanical motion may be converted to water motion—the wicket gates are capable of regulating the flow of water from the turbine runner back through the penstock tube. This is particularly useful when a sudden loss of power to the generator occurs and back-flow must be prevented.

Throughout the course of operation of the turbine, the demand for water may vary between the maximum intake possible, to almost no water at all—within a short period of time. At high water flow rates the wicket gates are plagued by problems of erosion and cavitation pitting. At low or no water flow, marine growth and corrosion plague the submerged gates. These problems directly alter the surface profile of the gates, resulting in a reduction in the effective water flow rate through the penstock tube to the turbine vanes. Wicket gates are designed with shapes that permit optimized water flow, to the vanes, with minimal turbulence. Corruption of the gate surface by erosion and cavitational pitting, as well as by marine growth, increases turbulence and thereby decreases the water flow rate.

A further problem, which occurs in cold water regions only, is the formation of ice on underwater structures such as wicket gates. Ice formation may occur at high as well as at low—or no—water flow rates. In general, ice borne along by flowing water, or ice formed at nucleation sites on the structure, may build up and reduce the effective flow rate of water past the gate. For a more thorough discussion of the problems associated with ice build-up on underwater hydroelectric plant structures attention is called to U.S. Pat. No. 4,846,966.

Current wicket gates are fabricated of cast iron or steel, metals that give rise to the problems noted above. In particular, if left untreated, they quickly corrode in salt water. During periods of low water flow they provide an ideal surface for marine growth—which must be removed to maintain the desired surface profile. Current environmental regulations limit the use of paints with the most effective anti-fouling properties, and the use of less-effective, but environmentally safer paints has shortened the required maintenance interval for the hard-to-reach wicket gates.

In addition to the low flow rate problems, there are the problems associated with high water flow rates— primarily erosion and pitting caused by cavitation. Erosion in this context, involves the gradual wearing-away of the surface of a submerged structure. It is caused by the abrasive effect of impinging particles that are carried along by rapidly moving water. Pitting, on the other hand, occurs when gas-filled cavities, created by structure vibration, collapse on the surface of the structure. This collapse imparts a pressure pulse to the surface which is of such magnitude that it actually removes small pieces of metal. A pitted surface profile results, causing more turbulence and associated vibration, thereby accelerating the cavitation-caused damage.

In order to operate the turbine at its optimal level, it is therefore necessary to perform regular maintenance procedures on the gates. However, due to their location well within the hydro-power system, it is extremely difficult to gain access to them. Any maintenance requires shutting down the power-generation operation and sending divers into the penstock tube. The divers are required to inspect, and, if possible, to make repairs in situ. When such repairs are not possible, the gates must be removed and brought through the penstock tube and up to the water surface. Due to the dimensions and weight of the gates, they must be removed individually. Because of the awkwardness of the retrieval operation, the gates are dragged through the tube, often resulting in damage to the gates, the tube, or both.

To circumvent the effects of marine growth, ice build-up, corrosion, erosion and cavitation, metals resistant to these effects have been utilized. For example, utilizing bronze will slow the deleterious effects considerably, as compared to the use of cast iron. The problem is that known erosion- and cavitation-resistant metals are very expensive and are often extremely difficult to machine to the close tolerances required to achieve optimum water flow-through. Any overall comparison between an expensive yet resistant material and a less-resistant material generally results in selection of the latter even though such selection means more frequent repairs and replacements.

Another approach to minimizing the effects of cavitation is through the shaping of the turbine components, including the wicket gates, so as to increase the maximum flow rates achievable with minimum turbulence (i.e., minimum turbulence at the boundary between the submerged body and the flowing water). Although these efforts ameliorate the effects of cavitation—by reducing the formation of bubbles at the boundary layer—they do not eliminate them; thus periodic maintenance and replacement of the wicket gates is still required. Other design optimization techniques include selection of the location of the turbine and control of the turbine operation. Changes in these parameters may result in a reduction in the effects of erosion and cavitation, but such a reduction often comes at the expense of the power-generating capacity of the hydroelectric unit. The net effect of such an effort is an extension of the maintenance life-cycle and a reduction in power output.

In recent years viscoelastic materials, with their favorable strength-to-weight ratio and corrosion-resistance capacity, have been used to extend maintenance life cycles without encroaching upon the turbine operating parameters. These materials are considered to be effective in reducing cavitation because of their capacity to attenuate vibrations. However, viscoelastic materials have not been considered for use in the fabrication of the water-directing components of hydro-power generating systems, principally due to the concern that they would be unable to resist the tremendous forces exerted by rapidly flowing water. However, such materials have been considered for use in applications similar to, but much smaller than the wicket gates of hydroelectric turbines including, for example, small fixed-blade pumps.

In particular, Lobanoff (U.S. Pat. No. 3,876,327) discusses the advantages of fabricating pumps of viscoelastic materials, including their impact- and corrosion resistance, and also discusses the disadvantages of pumps comprising plastic-coated metal parts. Also, Wilkinson (U.S. Pat. No. 3,588,267) discloses stationary air-foil blades, made of a high-strength viscoelastic material, that are positioned between two aluminum hubs, and used in the design of a jet engine.

To overcome the deficiencies associated with the present wicket gates—so as to reduce the frequency of maintenance procedures—what is needed is a wicket gate that is: (1) formed of a material capable of resisting the surface profile distortions caused by marine growth, ice build-up, corrosion, erosion, and pitting; (2) durable enough to withstand, without distortion, the stress imposed by the high-pressure flow of thousands of gallons of water per minute; (3) sufficiently "damped" (i.e., energy absorbent) to minimize structural vibrations that cause cavitation; and (4) lightweight enough to minimize hydraulic system fatigue.

SUMMARY OF THE INVENTION

It is the principal object of the present invention to utilize viscoelastic materials for both the fabrication and the retrofitting of wicket gates. This shift from the metals traditionally used, eliminates the problems of erosion and corrosion, retards marine growth and ice build-up, and results in an increase in the durability of the entire hydraulic system. It is a further object of the present invention to provide wicket gates that are durable enough to withstand, without distortion, the stresses imposed by thousands of gallons of rapidly flowing water. It is still a further object of the present invention to provide wicket gates that are lightweight enough to minimize system fatigue.

In accordance with the invention, wicket gates currently in use may be retrofitted with viscoelastic materials, such as polyurethane or high molecular weight polyethylene. The retrofit may be performed at the time of a regularly scheduled maintenance, after marine growth and corrosion have been removed from the surface of the gate. The viscoelastic material is then either cast- or injection-molded onto the cleaned surface. Prior to molding the viscoelastic material, a number of holes are drilled into and through the rotatable planar body of the gate. The molded viscoelastic material thereby becomes an integral component of the gate, rather than a simple top-coating on the surface of the gate that would otherwise debond under the severe loads experienced.

The thickness of the applied viscoelastic material may be varied from about 1/16 of an inch to about ¼ of an inch. The thickness is selected as a function of the particular material, the stress loading experienced, and its effect on the water flow rate. The hardness of the viscoelastic material can range, again depending upon the environmental conditions, from a Shore A hardness of 70 to a Shore D hardness of 60. The material must, however, be of sufficient hardness to minimize distortion under the flow rates encountered in the particular hydro-power installation.

Newly fabricated wicket gates are made with substantially more viscoelastic material. A core element, made of either metal or a high strength viscoelastic material, with a matrix of holes drilled through it, is utilized for structural support. The viscoelastic material is then either cast- or injection-molded on to the core. The size and shape of the core, as well as the hardness and thickness of the viscoelastic material, are all determined on the basis of the design and environment of the hydraulic turbine. The newly fabricated gates will reduce turbine system fatigue more effectively than the retrofitted ones, primarily because they consist of more of the viscoelastic material. Since the density of the viscoelastic material is about 1/7 that of steel—the most commonly used metal in wicket gates—the newly fabricated gates will be lighter in weight, and will therefore reduce the load on the structural elements of the turbine.

Although the reduction in weight is desireable, the primary benefits resulting from the addition of the viscoelastic material relate to the problems discussed. In particular, the energy absorbing characteristics of viscoelastic materials reduce the amplitude of vibration of the body to which they are attached. Concerning wicket gates specifically, the application of the viscoelastic material dampens the vibration of the gate as water flows rapidly passed it. The reduction in the vibration level in turn reduces the formation of cavitation bubbles and the pitting caused by those bubbles. Viscoelastic materials also reduce the effects of erosion. Their resilience causes particles flowing through the water to bounce off the surface of the coated wicket gate rather than embed themselves or abrade the surface of the gate. Finally, the smooth surface profile resulting from the application of the viscoelastic material minimizes site availability for the attachment of marine life, and the coating isolates all ferrous surfaces, thereby reducing corrosion.

In summary, this invention comprises the application of a viscoelastic coating to traditional metal wicket gates, as well as the construction of entire wicket gates from a core of either metal or a high-strength viscoelastic material and molding the viscoelastic coating onto this core. The present invention thereby resists surface profile distortions caused by corrosion, marine growth, erosion and pitting caused by cavitation, is lightweight enough to minimize system fatigue, and yet is strong enough to withstand the high stress loadings caused by thousands of gallons of rapidly moving water.

PREFERRED EMBODIMENT OF THE INVENTION

Figure 1:
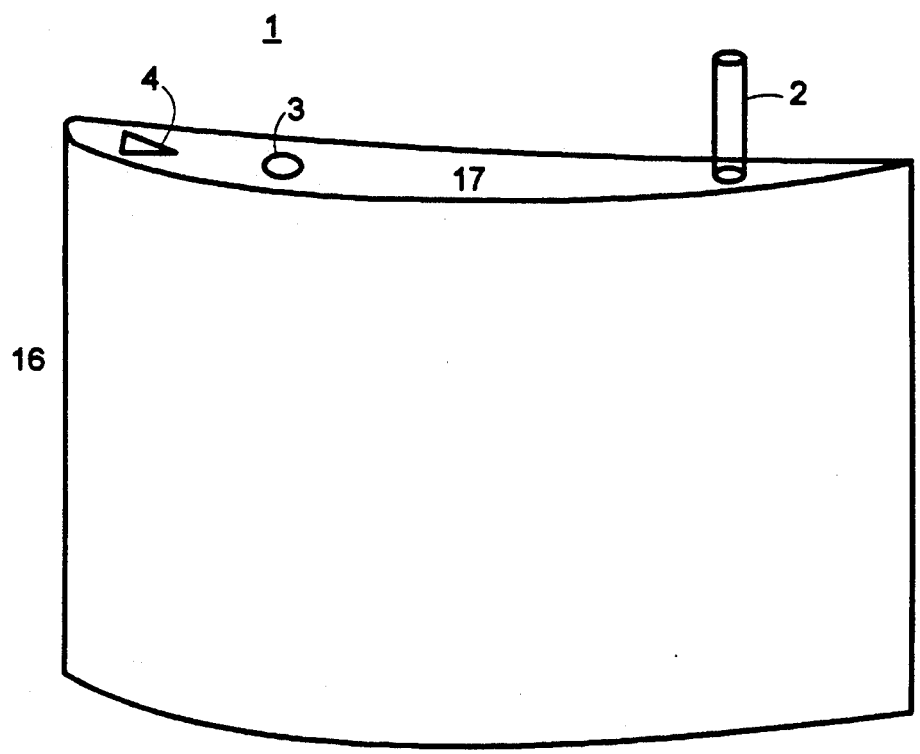
FIG. 1 is a perspective view of a wicket gate.

The drawings depict the preferred embodiment of the invention. For definiteness, certain geometrical proportions are utilized in the drawings; however, the proportions selected are not meant in any way as limiting constraints on the subject matter claimed. For example, the drawings show a wicket gate 1 oriented horizontally with a length-to-width ratio of approximately 3:2, and a perpendicular strut 2, which is affixed to a top surface 17 of a rotatable planar body 16 of said wicket gate 1. In practice, said wicket gate 1 may be of any similar shape and, depending on the particular location in a hydraulic system, and the type of turbine in use, said wicket gate 1 may have any orientation.

Figure 2:
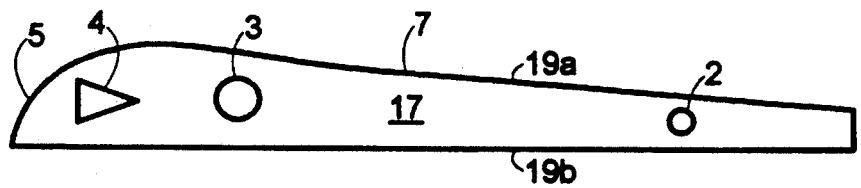
FIG. 2 is a bottom view of a wicket gate.

FIG. 1 is a perspective view of said wicket gate 1, said perpendicular strut 2, a circularly-shaped pivot chute 3, and a triangularly-shaped flush flow venting chute 4. Said pivot chute 3 and said venting chute 4 extend from said top surface 17 of said planar body 16 and down through said planar body 16. FIG. 2 illustrates that in the preferred embodiment said wicket gate 1 is wing-shaped, with a rounded leading edge 5. A continuous surface 7 of said wicket gate 1 reduces turbulence as water passes by said wicket gate 1 on its way to a turbine.

Figure 3:
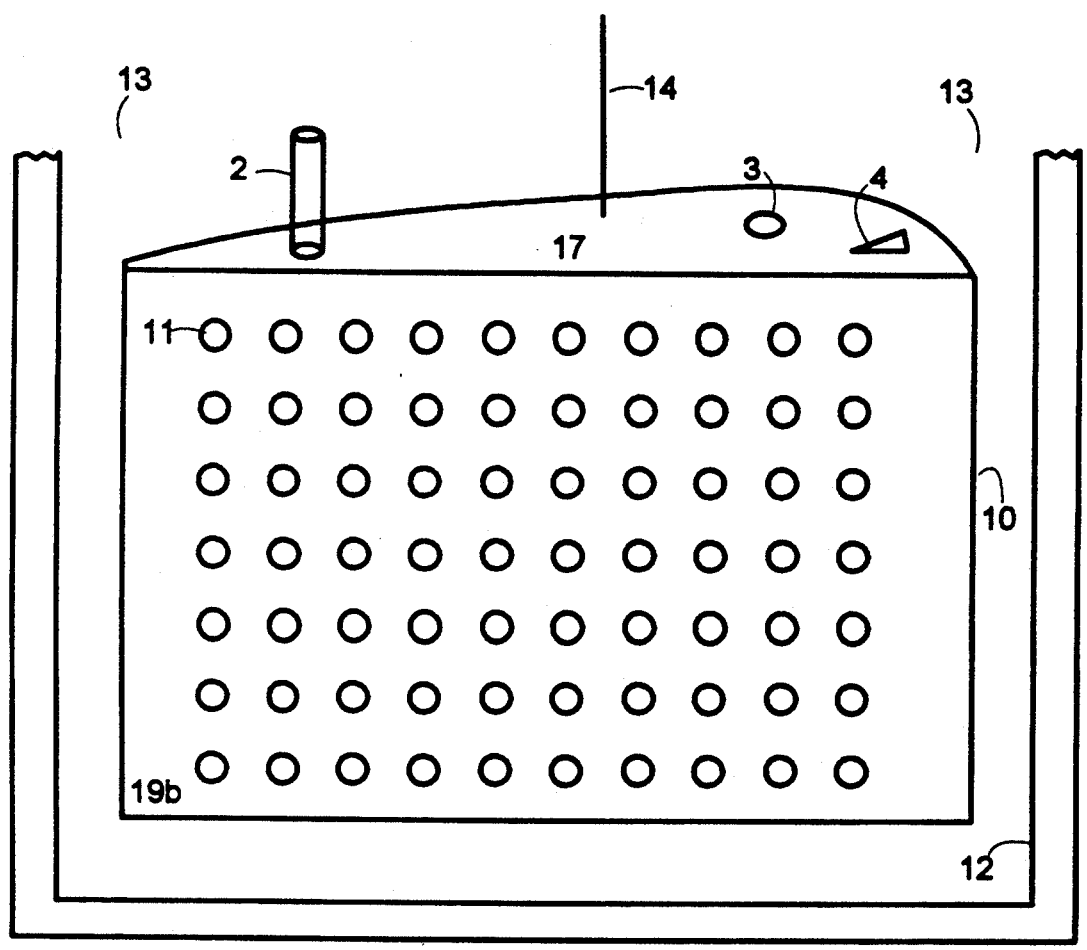
FIG. 3 is a perspective view of a steel core in a mold for an improved wicket gate.
Figure 4:
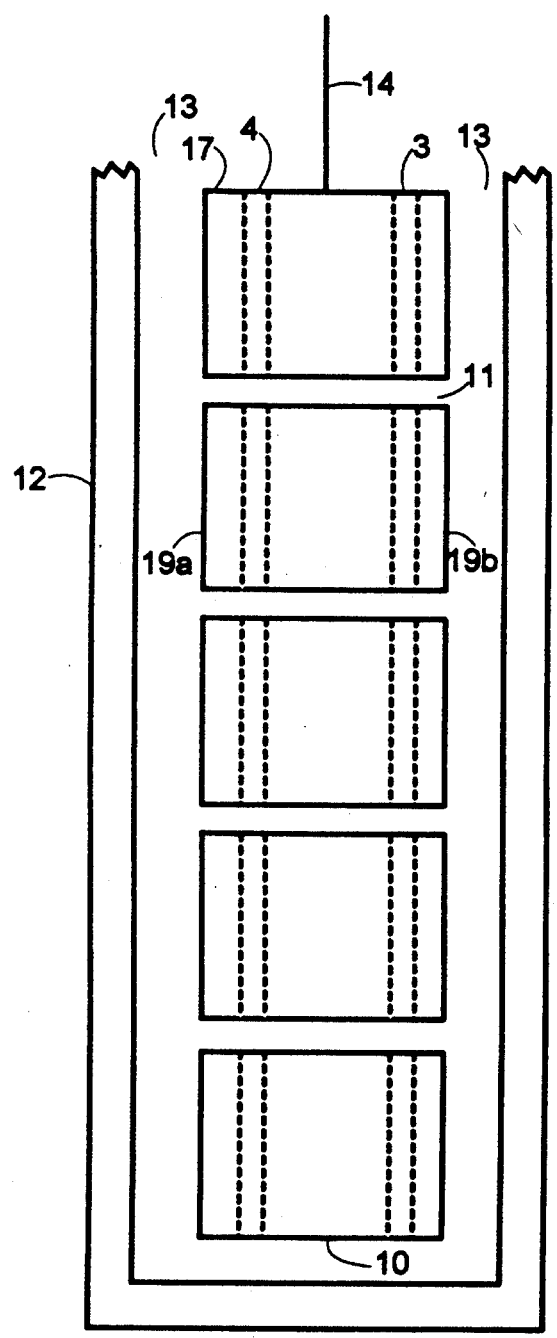
FIG. 4 is a side view of a steel core in a mold for an improved wicket gate.

The preferred embodiment of the invention consists of adapting the fabrication of cast-molded polyurethane to the manufacture of said wicket gate 1, as illustrated in FIGS. 3 and 4. More particularly, a steel core 10 is shaped into the same configuration as said wicket gate 1, but with all dimensions reduced by one-half inch from the original dimensions of said wicket gate 1. A plurality of one-inch diameter holes 11, equally spaced one-inch on center, are drilled completely through faces 19a and 19b of said steel core 10. Said steel core 10 is then grit-blasted to provide a suitable bonding surface for said cast-molded polyurethane. Said pivot chute 3 and said venting chute 4 are then masked to prevent polyurethane clogging. Finally, said steel core 10 is cleaned with a suitable solvent in preparation for casting.

A mold 12 is then fabricated of either wood, aluminum, or fiberglass. Said mold 12 is formed into the same configuration as said steel core 10, but with internal dimensions one-half inch greater than the dimensions of said steel core 10, and one open end 13. Next, a suitable mold release agent is applied to all inside surfaces of said mold 12. Said steel core 10 is then suspended, centered, in said mold 12 through said open end 13 by means of a wire 14. A polyester-based polyurethane is mixed and poured into said mold 12, through said open end 13, and around said steel core 10. In the preferred embodiment, a vacuum is applied to said polyurethane in said mold 12 so as to remove entrapped air and improve polyurethane-to-steel core 10 bonding and the wicket gate 1 surface profile.

Said wicket gate 1 with a polyurethane coating is removed from said mold 12 when said polyurethane has cured to a satisfactory de-molding hardness. If necessary, said polyurethane is post-cured to achieve a Shore A hardness of 85. Upon completion of said post-curing, all excess polyurethane is trimmed from said steel core 10 in order to provide a satisfactory surface profile.

Although the present invention has been described in its preferred form and preferred practice with a certain degree of particularity, it is understood that the present disclosure of the preferred form and preferred practice has been made only by way of example and that changes in the details of fabrication and selection of elements may be made without departing from the spirit and scope of the invention claimed.

I claim:

1. A wicket gate of a hydraulic turbine, said wicket gate comprising:
   a. a rotatable core element, wherein said rotatable core element is fabricated of a high-strength viscoelastic material;
   b. a viscoelastic coating affixed to said rotatable core element, wherein said viscoelastic coating is formed of a viscoelastic material, wherein said viscoelastic material is of a hardness in the range from 70 Shore A to 60 Shore D, and wherein said viscoelastic coating is of a thickness in the range from about 1/16-inch to about ½-inch.

2. The wicket gate as claimed in claim 1 wherein said viscoelastic coating is affixed to said rotatable core element by injection-molding means.

3. The wicket gate as claimed in claim 1 wherein said viscoelastic coating is affixed to said rotatable core element by cast-molding means.

4. The wicket gate as claimed in claim 1 wherein said viscoelastic coating is polyurethane.

5. The wicket gate as claimed in claim 4 wherein said polyurethane is a polyester-based polyurethane.

6. The wicket gate as claimed in claim 5 wherein said polyester-based polyurethane has a Shore A hardness of 85.

7. The wicket gate as claimed in claim 1 wherein said rotatable core element further comprises a plurality of holes, wherein said holes are drilled entirely through two faces of said rotatable core element.

8. The wicket gate as claimed in claim 7 wherein each of said plurality of holes has a diameter of about one inch and wherein said holes are equally spaced about one inch apart.

9. A method of making a wicket gate of a hydraulic turbine, wherein said wicket gate comprises a rotatable core element fabricated of high-strength viscoelastic material, wherein said rotatable core element is affixable to said hydraulic turbine and a viscoelastic coating is affixable to said rotatable core element, wherein said viscoelastic coating is formed of a viscoelastic material having a hardness in the range from 70 Shore A to 60 Shore D, the method of making said wicket gate comprising the steps of:
   a. forming a plurality of holes entirely through two faces of said rotatable core element;
   b. preparing all surfaces of said rotatable core element to enhance attachment of said viscoelastic coating to said rotatable core element; and
   c. applying said viscoelastic material to said rotatable core element to a thickness in the range from about 1/16-inch to about 1/2-inch, so as to form said viscoelastic coating.

10. The method of making a wicket gate as claimed in claim 9 wherein the step of applying said viscoelastic material to said rotatable core element comprises injection-molding said viscoelastic material onto said rotatable core element.

11. The method of making a wicket gate as claimed in claim 9 wherein the step of applying said viscoelastic material to said rotatable core element comprises cast-molding said viscoelastic material onto said rotatable core element.

12. The method of making a wicket gate as claimed in claim 9 wherein said viscoelastic material is polyurethane.

13. The method of making a wicket gate as claimed in claim 12 wherein said polyurethane is a polyester-based polyurethane.

14. The method of making a wicket gate as claimed in claim 13 wherein said polyester-based polyurethane has a Shore A hardness of 85.

15. A method of making a wicket gate of a hydraulic turbine comprising the steps of:
   a. forming a rotatable core element of a shape and size suitable for directing water to said hydraulic turbine, wherein said rotatable core element is fabricated of a high-strength viscoelastic material;
   b. forming a plurality of holes entirely through two faces of said core element;
   c. preparing all surfaces of said core element to enhance attachment of a viscoelastic coating to said core element;
   d. forming said viscoelastic coating of a viscoelastic material with a hardness in the range from 70 Shore A to 60 Shore D; and
   e. applying said viscoelastic material to said core element to a thickness in the range from about 1/16-inch to about 1/2-inch so as to form said viscoelastic coating.

16. The method of making a wicket gate as claimed in claim 15 wherein said viscoelastic material is polyurethane.

17. The method of making a wicked gate as claimed in claim 16 wherein said polyurethane is a polyester-based polyurethane.

18. The method of making a wicket gate as claimed in claim 17 wherein said polyester-based polyurethane has a Shore A hardness of 85.

19. The method of making a wicket gate as claimed in claim 15 wherein the step of applying said viscoelastic material to said core element comprises injection-molding said viscoelastic material directly onto said core element.

20. The method of making a wicket gate as claimed in claim 15 wherein the step of applying said coating material to said core element comprises cast-molding said viscoelastic material directly onto said core element.

21. The method of making a wicket gate as claimed in claim 15 wherein each of said plurality of holes formed in said core element is about one inch in diameter.

22. The method of making a wicket gate as claimed in claim 21 wherein said plurality of holes are equally spaced.

23. A wicket gate of a hydraulic turbine, said wicket gate comprising:
   a. a rotatable core element of a shape and size suitable for directing water to said hydraulic turbine, wherein said rotatable core element is fabricated of a high-strength viscoelastic material;
   b. a viscoelastic coating affixable to said core element, wherein said viscoelastic coating is formed of a viscoelastic material, wherein said viscoelastic material is of a hardness in the range from 70 Shore A to 60 Shore D, and wherein said viscoelastic coating is of a thickness in the range from about 1/16-inch to about ½-inch; and
   c. attachment means to attach said wicket gate to said hydraulic turbine.

24. The wicket gate as claimed in claim 23 wherein said viscoelastic coating is affixable to said core element by injection-molding means.

25. The wicket gate as claimed in claim 23 wherein said viscoelastic coating is affixable to said core element by cast-molding means.

26. The wicket gate as claimed in claim 23 wherein said viscoelastic material is polyurethane.

27. The wicket gate as claimed in claim 26 wherein said polyurethane is a polyester-based polyurethane.

28. the wicket gate as claimed in claim 27 wherein said polyester-based polyurethane has a Shore A hardness of 85.

29. The wicket gate as claimed in claim 23 wherein said core element comprises a plurality of holes, wherein each of said plurality of holes is formed essentially entirely through two faces of said core element.

30. The wicket gate as claimed in claim 29 wherein each of said plurality of holes has a diameter of about one inch and wherein said plurality of holes are equally spaced.

31. The wicket gate as claimed in claim 23 wherein said high-strength viscoelastic material used to fabricated said rotatable core element is polyethylene.

32. A wicket gate of a hydraulic turbine, said wicket gate comprising:
   a. a high-strength viscoelastic core element of a shape and size suitable for directing water to said hydraulic turbine, wherein said steel core element comprises a plurality of holes drilled entirely through two faces of said core element, and wherein said plurality of holes:
      i. each has a diameter of about one inch; and
      ii. are equally spaced from each other;
   b. a viscoelastic coating affixable to said core element, wherein said viscoelastic coating is formed of a viscoelastic material that is cast-molded onto said core element to a thickness of about ¼-inch, and wherein said viscoelastic material:
      i. is a polyester-based polyurethane; and
      ii. is of a Shore A hardness of 85; and
   c. attachment means to attach said wicket gate to said hydraulic turbine.

* * * * *